(12) United States Patent
Burtner et al.

(10) Patent No.: US 10,152,679 B2
(45) Date of Patent: Dec. 11, 2018

(54) WIRELESS REMOTE ASSET TRACKING SYSTEM AND METHOD

(71) Applicant: The Burtner Group, LLC, Reston, VA (US)

(72) Inventors: Richard Lee Burtner, Broadlands, VA (US); Jason Michael Gafa, Bartlett, TN (US)

(73) Assignee: THE BURTNER GROUP, LLC, Reston, VA (US)

( * ) Notice: Subject to any disclaimer, the term of this patent is extended or adjusted under 35 U.S.C. 154(b) by 0 days.

(21) Appl. No.: 15/045,236

(22) Filed: Feb. 16, 2016

(65) Prior Publication Data

US 2017/0023377 A1 Jan. 26, 2017

Related U.S. Application Data

(60) Provisional application No. 62/116,356, filed on Feb. 13, 2015.

(51) Int. Cl.
*G06Q 10/08* (2012.01)
*G08B 13/24* (2006.01)
*G08B 25/08* (2006.01)
*G06Q 10/00* (2012.01)

(52) U.S. Cl.
CPC ......... *G06Q 10/00* (2013.01); *G08B 13/2462* (2013.01); *G08B 25/08* (2013.01)

(58) Field of Classification Search
CPC . G01C 21/3676; G06Q 10/08; G06Q 10/0833
See application file for complete search history.

(56) References Cited

U.S. PATENT DOCUMENTS

| | | | | |
|---|---|---|---|---|
| 2005/0246070 | A1* | 11/2005 | Matsuura | F02N 11/0807 701/2 |
| 2008/0125965 | A1* | 5/2008 | Carani | G07C 5/008 701/408 |
| 2010/0094688 | A1* | 4/2010 | Olsen, III | G06Q 10/04 705/7.42 |
| 2010/0185479 | A1* | 7/2010 | Brinton | G08G 1/096805 701/408 |
| 2014/0129274 | A1* | 5/2014 | Lluberes | G06Q 10/06311 705/7.15 |

* cited by examiner

*Primary Examiner* — Charles J Han
(74) *Attorney, Agent, or Firm* — Symbus Law Group, LLC; Clifford D. Hyra

(57) ABSTRACT

An asset tracking system includes sensors installed on an asset, where the sensors include a positioning sensor, and a remote central computing device configured to receive data from the sensors, process the data, associate it with a date/time of generation, and store the data in a database and including modules. A communication module receives requests for data and transmits the requested data, a display module displays the requested data, including indicating asset position on a map, an asset information module receives asset information and associates it with the asset, a route module receives route information, associates a driver with a route, and determines from the data whether the driver completes the route and whether the driver leaves the route, and a dashboard module displays a time-period data summary detailing information associated with the asset position over a set period of time.

16 Claims, 16 Drawing Sheets
(14 of 16 Drawing Sheet(s) Filed in Color)

WIRELESS REMOTE ASSET TRACKING SYSTEM AND METHOD

This application claims the benefit of U.S. Provisional Application No. 62/116,356, filed Feb. 13, 2015, which is hereby incorporated by reference in its entirety.

BACKGROUND

The application relates generally to remote asset monitoring, and particularly to wireless asset tracking and sensor monitoring, and management thereof.

Many of the existing asset tracking systems are expensive and have limited data processing and remote management functionality, while not taking full advantage of technological improvements such as the cloud and AWS server cost efficiency.

Needs exist for improved asset tracking systems and methods, especially for after market segments not filled by OEM solutions.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In certain embodiments, the disclosed embodiments may include one or more of the features described herein.

A new asset tracking method includes installing one or more sensors on an asset to be tracked, where the sensors comprise a positioning sensor, transmitting data wirelessly from the sensors to a remote central computing device, processing the data, associating it with a date/time of generation, and storing the data in a database, receiving a request for some of the data from a remote user computing device, transmitting the requested data to the remote user computing device, displaying the requested data on the remote user computing device, including displaying data from the positioning sensor overlaid on a map to indicate a position of the asset, receiving asset information from the remote user computing device and associating it with the asset, receiving route information from the remote user computing device, associating a driver with a route, and determining from the data whether the driver completes the route and whether the driver leaves the route, displaying a time-period data summary on the remote user computing device detailing information associated with the asset position over a set period of time, and displaying a route summary on the remote user computing device detailing compliance with set routes by the driver over the time period.

The asset information may include graphics for display on the map as part of displaying the data from the positioning sensor.

The method may include receiving geofence coordinates from the remote user computing device and sending a notification when the data indicates that the asset crosses a boundary between geofence coordinates.

The method may also include receiving instructions for remote control of an asset and opening an interposing relay that controls flow of electricity to a circuit on the asset accordingly. The circuit on the asset may be a starter circuit, and opening the interposing relay may prevent the asset from starting. The method may also include verifying that the asset is not operating before opening the interposing relay.

Displaying a time-period data summary detailing information associated with the asset position over a set period of time may also include displaying geofence violations, engine idle time, total time of use for the asset, top speed, and miles driven. The asset and additional assets may make up a fleet, and the method may also include displaying the time-period data summary for the fleet, the data summary including fleet-level statistics. Displaying data from the positioning sensor overlaid on a map to indicate a position of the asset may also include indicating a position and current route of each asset in the fleet on the map simultaneously.

Displaying a route summary may also include displaying for the asset a number of completed routes and percentage of total routes completed, a number of incomplete routes and a number of routed miles not traveled, and a time and distance driven off-route.

The method may also include sending a notification to the remote user computing device responsive to the sensors detecting on the asset a temperature violation, an open door, a low or high tank level, an alarm system activation, a panic button activation, speed exceeding a threshold level, geofence crossing, landmark arrival or departure, and/or a route change.

A new asset tracking system includes one or more sensors installed on an asset to be tracked, for example in an after-market application, where the sensors comprise a positioning sensor, a remote central computing device configured to receive data from the sensors, process the data, associate it with a date/time of generation, and store the data in a database and comprising modules, including: a communications module configured to receive requests for data from remote user computing devices and to transmit requested data to the remote user computing devices, a display module configured to display the requested data on the remote user computing device, including displaying data from the positioning sensor overlaid on a map to indicate a position of the asset, an asset information module configured to receive asset information from the remote user computing device and associate it with the asset, a route module configured to receive route information from the remote user computing device, associate a driver with a route, and determine from the data whether the driver completes the route and whether the driver leaves the route, and a dashboard module configured to display a time-period data summary on the remote user computing device detailing information associated with the asset position over a set period of time and to display a route summary on the remote user computing device detailing compliance with set routes by the driver over the time period.

The asset information may include graphics for display on the map as part displaying the data from the positioning sensor.

The modules may also include a geofence module configured to receive geofence coordinates from the remote user computing device and send a notification when the data indicates that the asset crosses a boundary between the geofence coordinates.

The modules may also include a remote control module configured to receive instructions for remote control of an asset and open an interposing relay that controls flow of electricity to a circuit on the asset accordingly. The circuit on the asset may be a starter circuit, where opening the interposing relay prevents the asset from starting, and the remote control module may also be configured to verify that the asset is not operating before opening the interposing relay.

Displaying the time-period data summary detailing information associated with the asset position over a set period of time may include displaying geofence violations, engine idle time, total time of use for the asset, top speed, and miles driven. The asset and additional assets may make up a fleet and the dashboard module may be further configured to display the time-period data summary for the fleet, the data summary including fleet-level statistics. Displaying data from the positioning sensor overlaid on a map to indicate a position of the asset may also include indicating a position and current route of each asset in the fleet on the map simultaneously.

Displaying a route summary may also include displaying for the asset a number of completed routes and percentage of total routes completed, a number of incomplete routes and a number of routed miles not traveled, and a time and distance driven off-route.

The modules may also include a notification module configured to send a notification to the remote user computing device responsive to the sensors detecting on the asset a temperature violation, an open door, a low or high tank level, an alarm system activation, a panic button activation, speed exceeding a threshold level, geofence crossing, landmark arrival or departure, and/or a route change.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated herein and form a part of the specification, illustrate exemplary embodiments and, together with the description, further serve to enable a person skilled in the pertinent art to make and use these embodiments and others that will be apparent to those skilled in the art.

DETAILED DESCRIPTION

Figure 1:
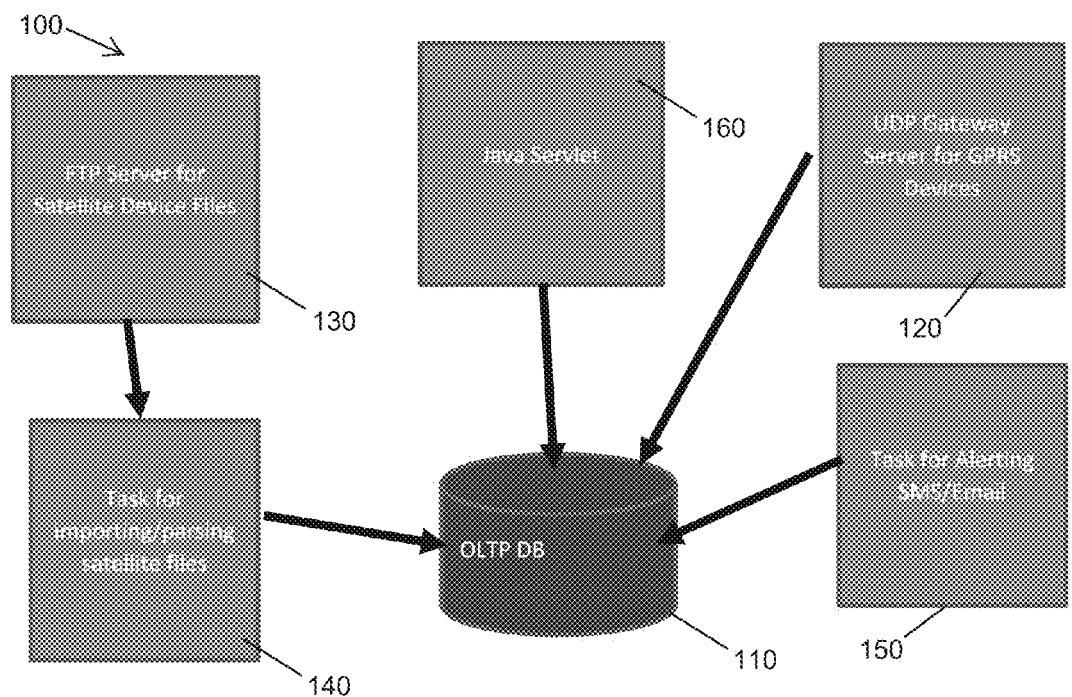
FIG. 1 is a diagram illustrating a backend architecture for an asset tracking system, in an embodiment.

A wireless asset tracking system and method will now be disclosed in terms of various exemplary embodiments. This specification discloses one or more embodiments that incorporate features of the invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The figures are not to scale. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail.

In some embodiments of the disclosed system, a wireless asset tracking solution comprises a suite of hardware devices and sensors mounted and installed on assets, such as private vehicles, commercial vehicles, generators or heavy machinery, etc., that sends raw data and/or GPS position information via a wireless network and/or satellite network, such as the GSM network used by AT&T and T-Mobile in the United States or the GlobalStar/other satellites network available on most continents and oceans, to a back-end platform and user-accessible tracking software GUI. The sensors are devices or hardware that detect or measure a physical property on a vehicle/asset. An asset is any type of equipment of useful value or property owned by a person or company. Raw data is untranslated data from the hardware.

The back-end platform includes the gateway, database and APIs required to store, display and translate raw data from the hardware. APIs are application programming interfaces with a defined function and method for interfacing with underlying operating systems or other programs running on a computer device. A gateway is software that enables communication between computer networks that use different communications protocols or formats. A database is a structured set of data that is accessible in various ways and saved for use in the GUI. The GUI is a graphical user interface that allows users to interact with the tracking solution.

The solution includes a complete offering including but not limited to hardware, network and web application as a whole. The web application includes the user (GUI) interface that the user accesses with e.g. a unique web address (URL) and login credentials to view, display and interact with the hardware installed on the vehicles and/or other assets. A vehicle may be any commercial or private car, truck or van that can be operated on the roadway. In other embodiments, vehicles may be extended to air, water, and/or other vehicles.

Hardware includes devices installed/mounted on a vehicle or asset that transmits and receives data to and from tracking software and a back-end platform. A network is a wireless transport method used to deliver data to and from the hardware and the tracking software and back-end platform. The network may be either cellular or satellite technology.

The tracking software and back-end platform allows the end user to better manage and report on a vehicle or other asset by, for example, accessing a website for the tracking software twenty-four hours a day, seven days a week, using a smart phone mobile tracking software application, and/or by receiving reports and/or alerts from the tracking software platform via e.g. email, text message, etc. on a personal cell phone. Tracking software is a user interface (GUI) that the user accesses with a unique web address (URL) (or software application, etc.) to view, display and interact with the hardware installed on the vehicles or assets. The user is an owner of the hardware and/or person with authorization to view, display and interact with the tracking software and/or the solution. A mobile application is a tracking software application designed to run on smartphones, tablet computers and other mobile devices.

An alert is a warning or notification of a user of a possible breach or problem with a vehicle or asset, for correction of the problem.

The solution bi-directionally links the data from the hardware mounted on the asset to the tracking software and back-end platform (in addition to receiving data from the hardware, instructions may also be sent to the hardware). The information and data may be used to improve efficiencies in a business and/or provide current geographical location of the asset(s) to a private user. Further, the solution allows a user to better manage business decisions and lower the cost of operating a fleet of vehicles and/or other assets and alert and protect a user from loss and theft.

A user can track, display, report and control various information with the tracking software and back-end platform. For example, the user may view a live route-based dashboard with a snap shot of the day's (or other time period's) events, such as completed routes vs total routes assigned, incomplete routes vs routes assigned, and time driving off routes and time driving on assigned routes. The user may view a live fleet-based dashboard with a snapshot of the day's events such as geofence violations, engine idle time, total time (hours, minutes, seconds) each vehicle was used today, top speed of the day and miles driven of the current day. The user may track, display, report and store the history and/or current GPS position of assets, history of a current driver or operator of an asset, history of a current assigned route of an asset vs. the actual route of the asset, history and current entry and exit of specific geographical locations (geofence), history of miles driven in a specific time, history and current speed of an asset (e.g. vehicle), current public traffic congestion, history and/or current engine idle time (asset not moving but engine is running), history and/or current engine run time (total time engine has operated in a specific time), history and/or current time of stop (asset not moving), history and/or current speed compared to the actual posted speed limit of the road the asset is located on, simultaneous views of all assets on one display screen (e.g. map overlay), monitored parameter reports such as individual trips, input and output data, routing and position data, history and/or current alerts from sensors, such as temperature violations, open door, tank level low or high, alarm system, panic button, etc., history and current alerts for speeding, geofence entry or exit, landmark arrival or departure, routing or rerouting of asset, independent third party or general public access and verification of asset location and assigned or scheduled routing.

The user may remotely control asset function, such as interrupting a circuit (e.g. starter disable), track, record, report etc. customer response time, receive alerts from an input panic button and view current or history status, receive alerts from an input alarm system and view current or history status, receive alerts from speeding or exceeding a predefined speed threshold, receive alerts from sensors (e.g. exceeding predefined output thresholds) and view current or history status, compare asset actual locations with asset actual destinations, save vehicle information including but not limited to make, model, year, color, license plate, yin number, size, capacity, fuel economy, etc., save driver information including but not limited to name, sex, address, phone number, cell phone carrier, email address, insurance information, state license information, etc., send and receive data using a communication means which is selected from the group consisting of: radio, cellular, digital radio, satellite, and the Internet, and compare, view and save a planned route and a route actually followed by an asset or vehicle.

FIG. 1 is a diagram illustrating a back end architecture 100 for an asset tracking system, in an embodiment. The backend architecture consists of several components running on Windows 2008 R2 Server. A MySQL database 110 preserves all the transactional data (e.g. time-stamped position information). The database 110 also includes tables for historical and archive purposes and can easily be relocated to another database. A UDP Java Program 120 listens to GPS devices and parses the locate information and other sensor information from the cellular, GPS and/or satellite devices into the database. An FTP server 130 receives Global Satellites files for device information. A task 140 imports the Global Satellites files from the FTP Server to the database, parsing sensor and location information from the files. Java servlet 160 processed speeding, geofencing, and other exception-type alert notifications, which are then delivered to an end user via SMS or email by task 150, which runs a Java application that sends email or SMS notifications for configurable alerts.

Figure 2:
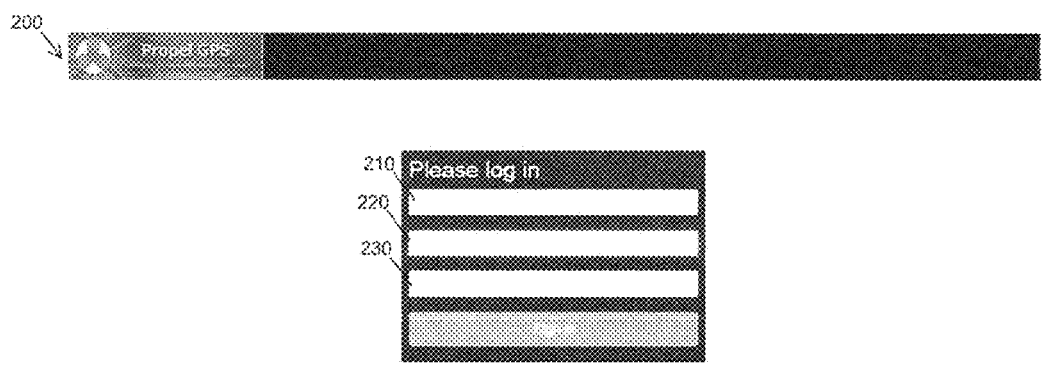
FIG. 2 is a screenshot illustrating a user login page for tracking software, in an embodiment. Log-in fields include company, user name, and password for a standard authentication process.

FIG. 2 is a screen shot illustrating a user login page 200 for tracking software, in an embodiment. Log-in fields include company 210, user name 220, and password 230 for a standard authentication process.

Figure 3:
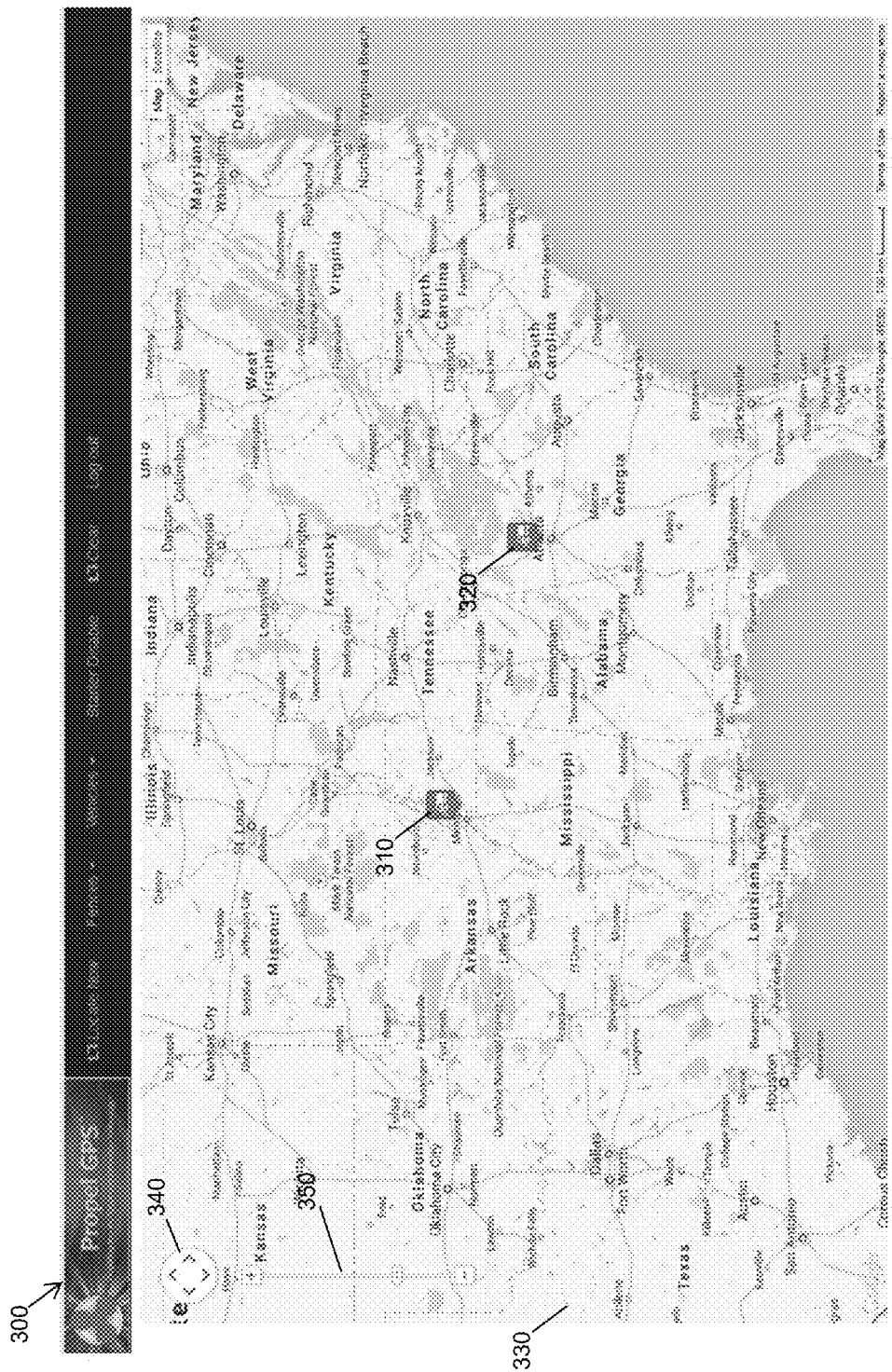
FIG. 3 is a screen shot illustrating icons on a map in an embodiment of a tracking software.

FIG. 3 is a screen shot 300 illustrating icons 310, 320 on a map 330 in an embodiment of a tracking software. To display asset information on the tracking software and back-end platform, an icon representing a vehicle (or other asset) is provided on a map. Here the map 330 is geographical, but in other embodiments may be a map of a structure or any location containing assets. If more than one vehicle is being tracked, then each vehicle may be represented by a unique icon 310, 320, which may differ from other icons in color, shape, and/or design. The icon is located on the map according to the geographical coordinates (raw data) received from hardware mounted on the asset. The provided maps may be provided by Microsoft or Google, registered photographs, scanned photographs, and/or from some other geographic map source. The maps may include but are not limited to digital maps, scanned maps, aerial photographs, and the like. Using the tracking software, a user can manipulate the maps to observe different areas, vehicles/assets, landmarks, and other features. The user can search for different locations, pan to different areas on a map using e.g. pan controls 340, and zoom in or out of an area or around an asset using e.g., zoom controls 350. The tracking software also provides data about the fleet, vehicles, assets, drivers and other relevant information.

Figure 4:
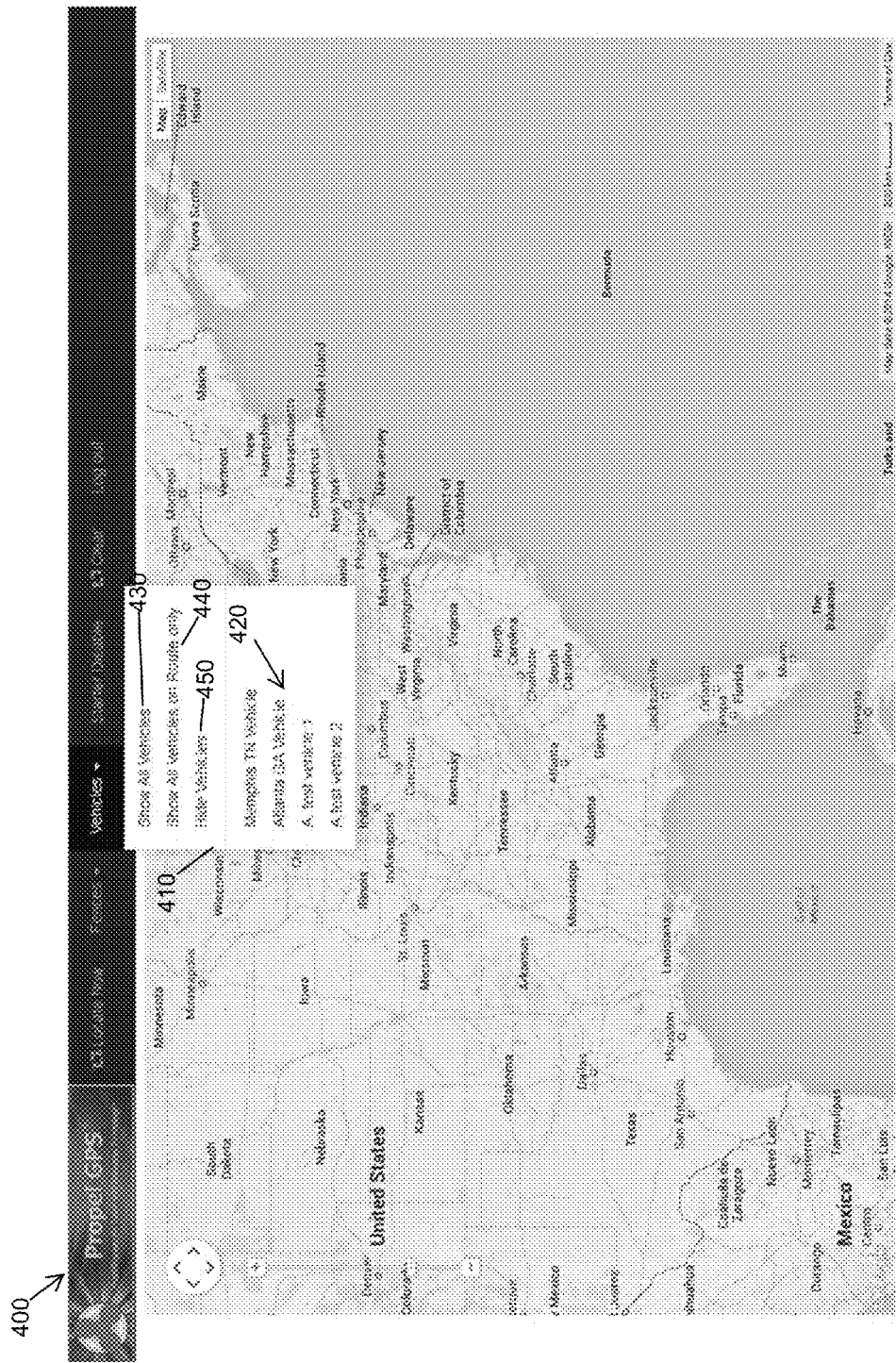
FIG. 4 is a screen shot containing information on all the vehicles or assets in a specific account, in an embodiment of a tracking software.

FIG. 4 is a screen shot 400 containing information on all the vehicles or assets in a specific account, in an embodiment of a tracking software. The vehicle information drop down 410 displays data on all of the vehicles in the fleet. The drop down 410 has options for the user to show all vehicles on the map 430, show all vehicles currently on a scheduled route on the map 440, or hide all vehicles 450 so they are not shown on the map. The drop down information includes a drop-down list 420 of all the vehicles in the fleet account. When a vehicle is selected from the list, the information displayed includes, but is not limited to, the following fields: vehicle id, make, model, year, state, type, color, phone, and driver. In other embodiments, some or all of this information may be displayed directly in the drop-down list, which may be user-configurable. A driver information link for a driver linked to the vehicle information is linked to driver information, which is described with regard to FIG. 5 below.

Figure 5:
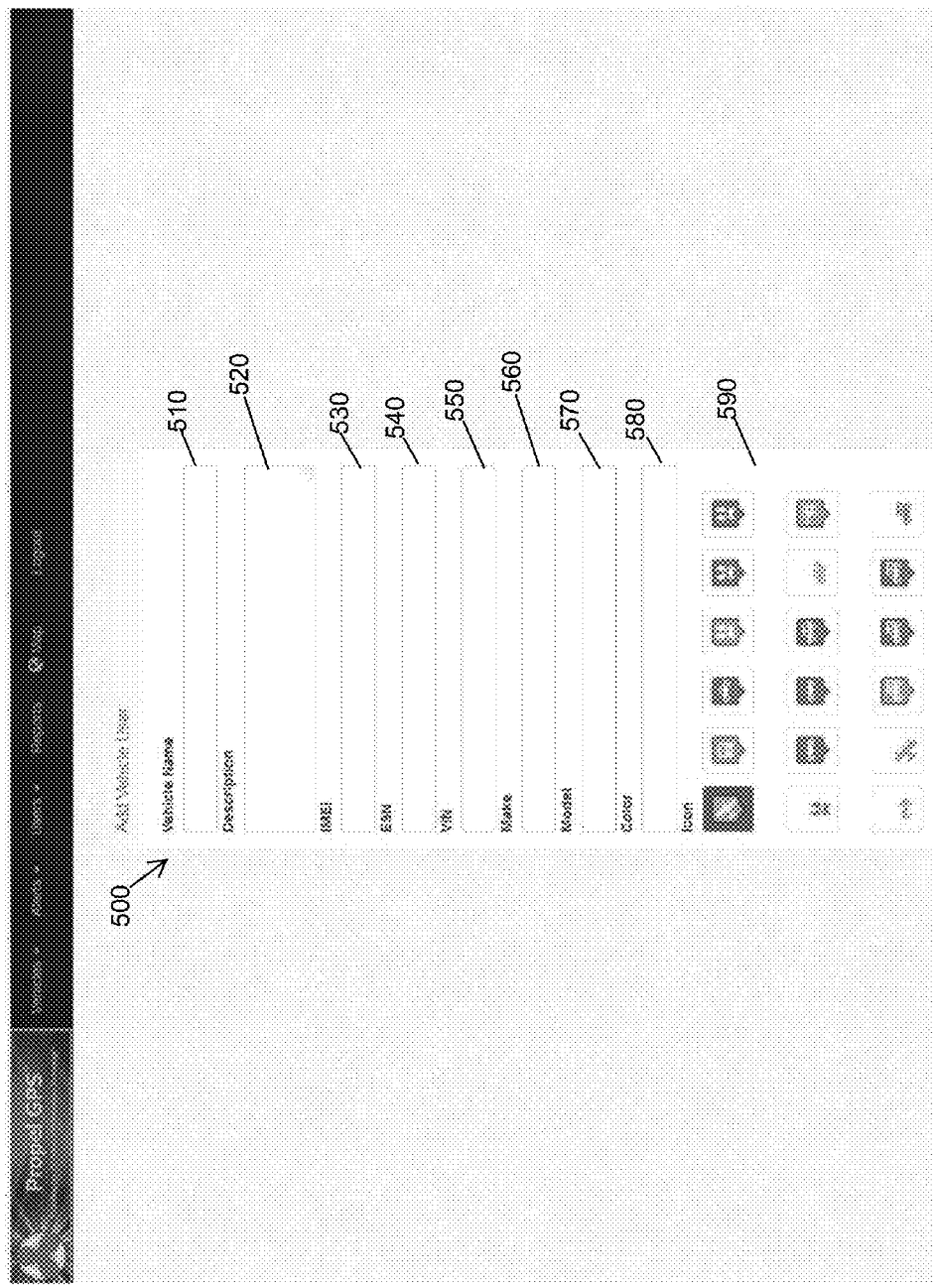
FIG. 5 is a screen shot showing a vehicle user and related driver information set up screen, in an embodiment of a tracking software.

FIG. 5 is a screen shot showing a vehicle user and related driver information set up screen 500, in an embodiment of a tracking software. This screen may be used to set up a new vehicle user for display on the map (e.g. of FIG. 3), for example when a new vehicle is deployed, tying vehicle information to position data associated with deployed hardware and with a display icon. The vehicle name field 510 is an optional name identifying the vehicle, e.g. "Charley's car." The description field 520 is an optional text field for the user to enter other identifying information. The IMEI field 530 is a unique hardware serial identification number associated with the hardware installed on the vehicle. The ESN field 540 is the unique hardware identification number that provides a singular footprint for a specific device. The VIN field 550 is for the vehicle or asset's unique identification number. The make field 560 is for the vehicle's manufacturer. The model field 570 is for the current vehicle's model. The year field is the year the vehicle was manufactured. The color field 580 is the color of the vehicle. The driver field (not shown) is the driver assigned to the vehicle when selected as an option. The icon field 590 is the icon assigned to the vehicle for display on the map (as in e.g. FIG. 3).

Figure 6:
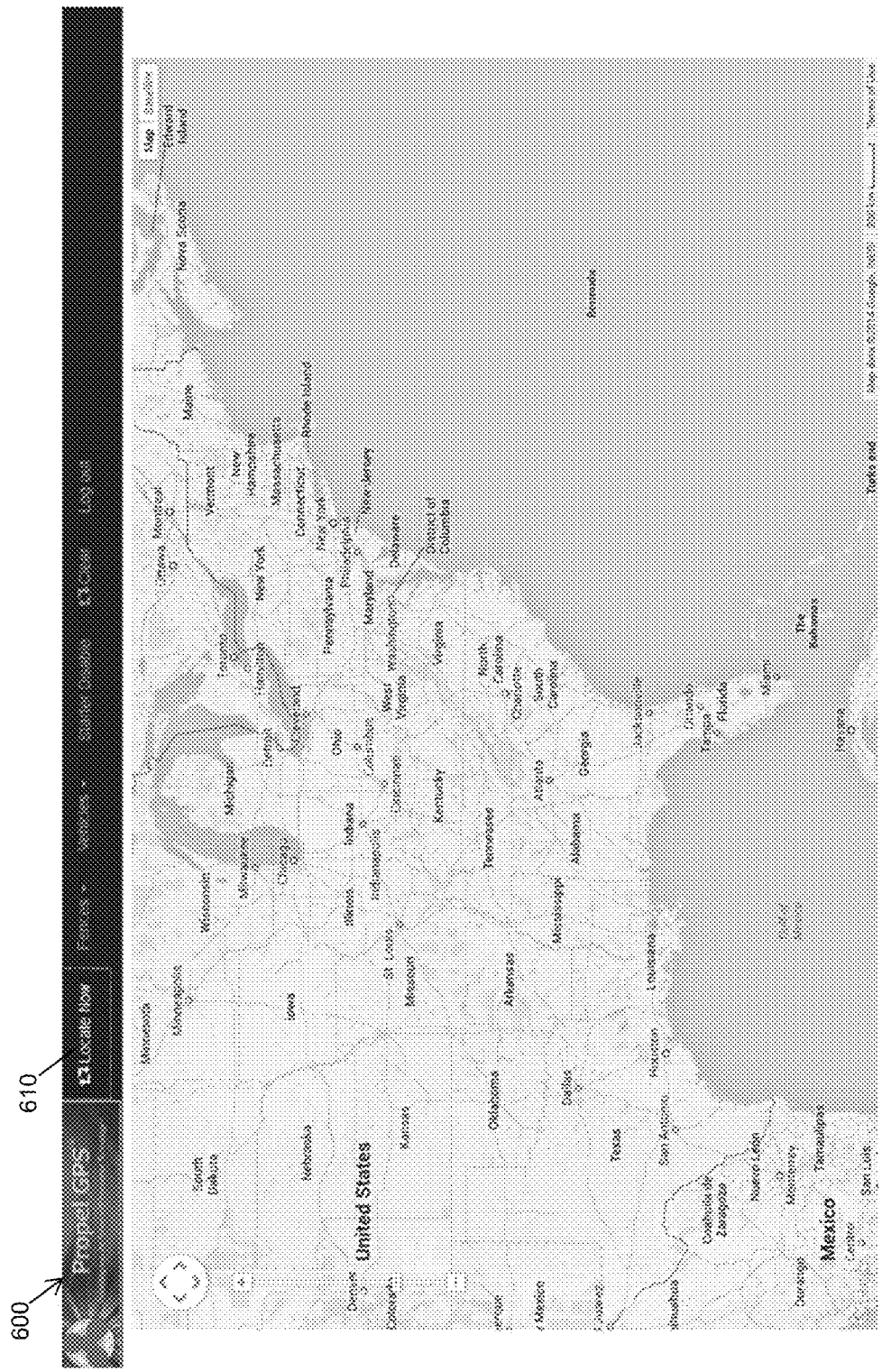
FIG. 6 is a screen shot showing a "Locate now" icon, in an embodiment of a tracking software.

FIG. 6 is a screen shot 600 showing a "Locate now" icon 610, in an embodiment of a tracking software. The "locate now" functionality gives the user the ability to send an immediate request to the hardware for a current location of an asset. The hardware returns the GPS position data and the corresponding icon is displayed on the map along with the raw latitude and longitude data and the reverse geo coded address of the asset or vehicle. In other embodiments, the positional data displayed may vary, and/or may be user-selectable. The asset to be located using the "locate now" functionality in embodiments may be selected in a popup or dropdown after selecting the "locate now" icon, or may have been previously selected for example from the vehicle dropdown.

Figure 7:
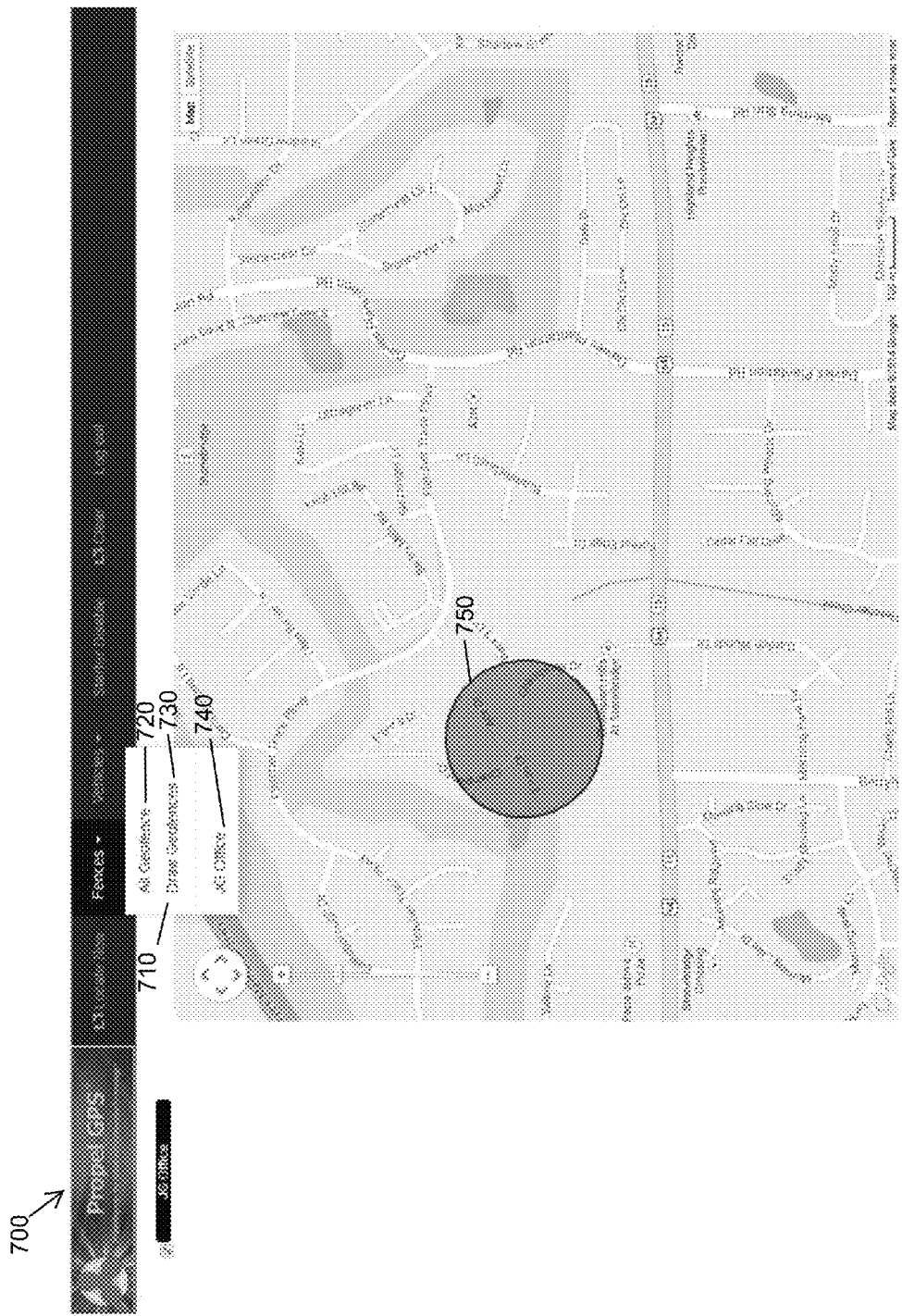
FIG. 7 is a screen shot of a Geo Fence capability, in an embodiment of a tracking software.

FIG. 7 is a screen shot 700 of a Geo Fence capability, in an embodiment of a tracking software. A geo fence is a virtual border or predefined location that can be monitored for entry and exit traffic. When an asset crosses the predefined virtual border a user may be notified immediately via email or text message on a personal cell phone and/or via the tracking software and back-end platform in the form of a pop-up message displayed on the screen. In other embodiments, notifications may be sent in any known manner and with any timing, and the method of notification, frequency of notification, etc. may be user-selectable. In some embodiments geo-fence crossings are recorded for later processing and no notifications are sent.

Geo-fence functionality is accessed via the Fences dropdown 710. All Geofence 720 may be selected to display all the geofences on the map that a user has currently set up and saved. Draw Geofence 730 allows the user of the tracking software the ability to create their own unique geofence, for example by drawing the desired virtual boundary on the map with an input such as a mouse pointer or touch input (for a touch screen). Boundaries may be drawn freehand or in preset shapes such as circles, squares, etc. using any known software drawing tools. The name "JG Office" 740 represents a current geofence created by a user. The grey circle 750 is the map display of the geofence named "JG Office." The "JG Office" selection on the drop-down may be used to toggle this map display on or off, which may also toggle the geo-fence itself on and off (e.g. when not shown on the map, the geo-fence may be inactive and notifications may not be sent when it is crossed).

Figure 8:
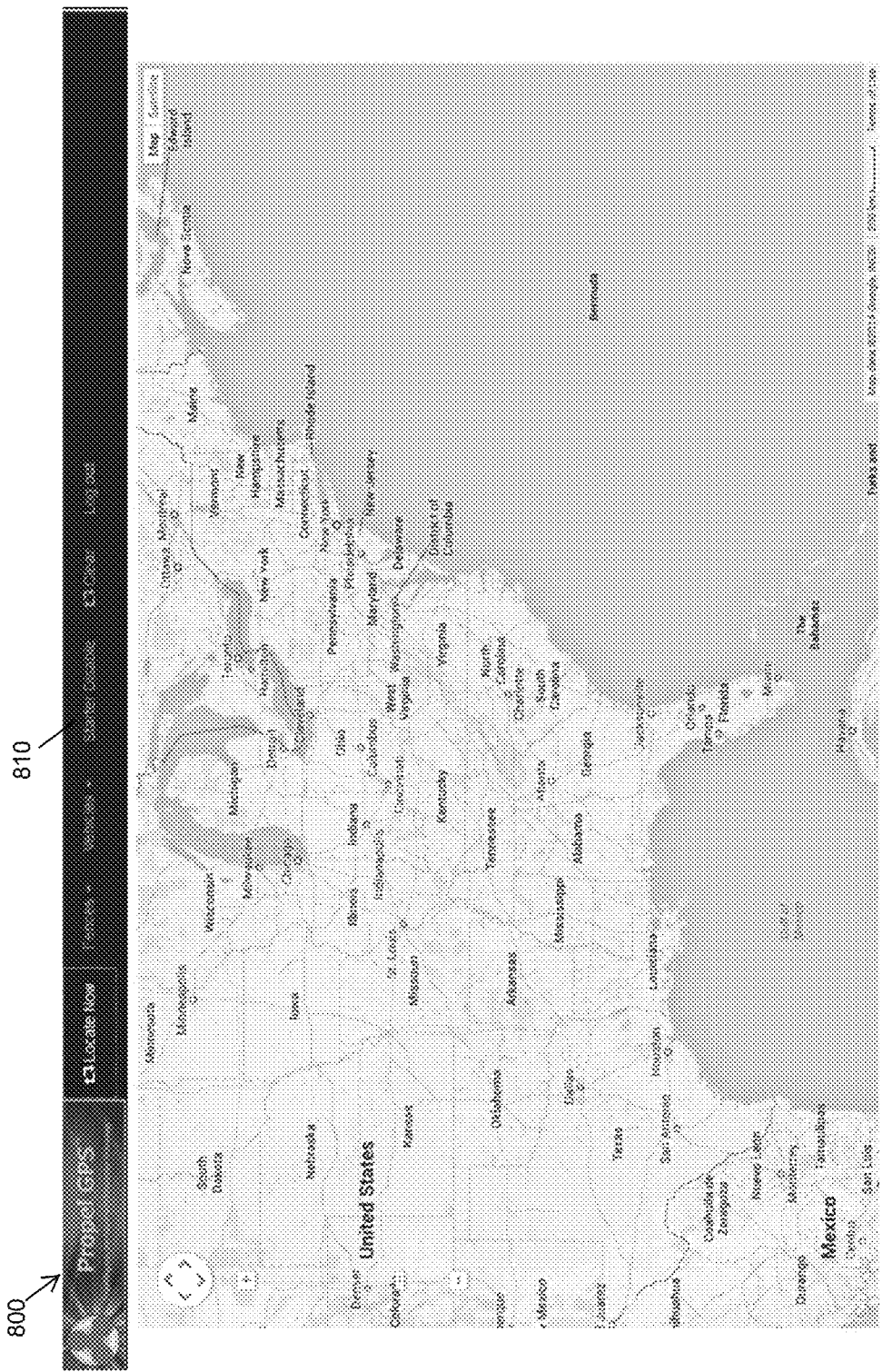
FIG. 8 is a screen shot showing a starter disable function, in an embodiment of a tracking software.

FIG. 8 is a screen shot 800 showing a starter disable function 810, in an embodiment of a tracking software. The starter disable function 810 allows the user of the tracking software and back-end platform the ability to remotely control the vehicle or asset by disconnecting or interrupting the current flow of a circuit, such as a starter circuit on a vehicle. The vehicle or asset has an interposing relay installed that can be opened and closed remotely that controls the flow of electricity to the circuit. The starter disable 810 is unselectable until an asset/vehicle is selected from the map or drop-down, after which the starter disable function 810 may become available for disabling the selected asset. NOTE: In this embodiment the vehicle or asset cannot be disabled if the engine is already running (on) when the signal is sent to disable the circuit, for safety reasons. This same remote circuit-control functionality may be used in other applications (e.g. with different assets), for example to prevent theft or unauthorized access to mobile assets.

Figure 9:
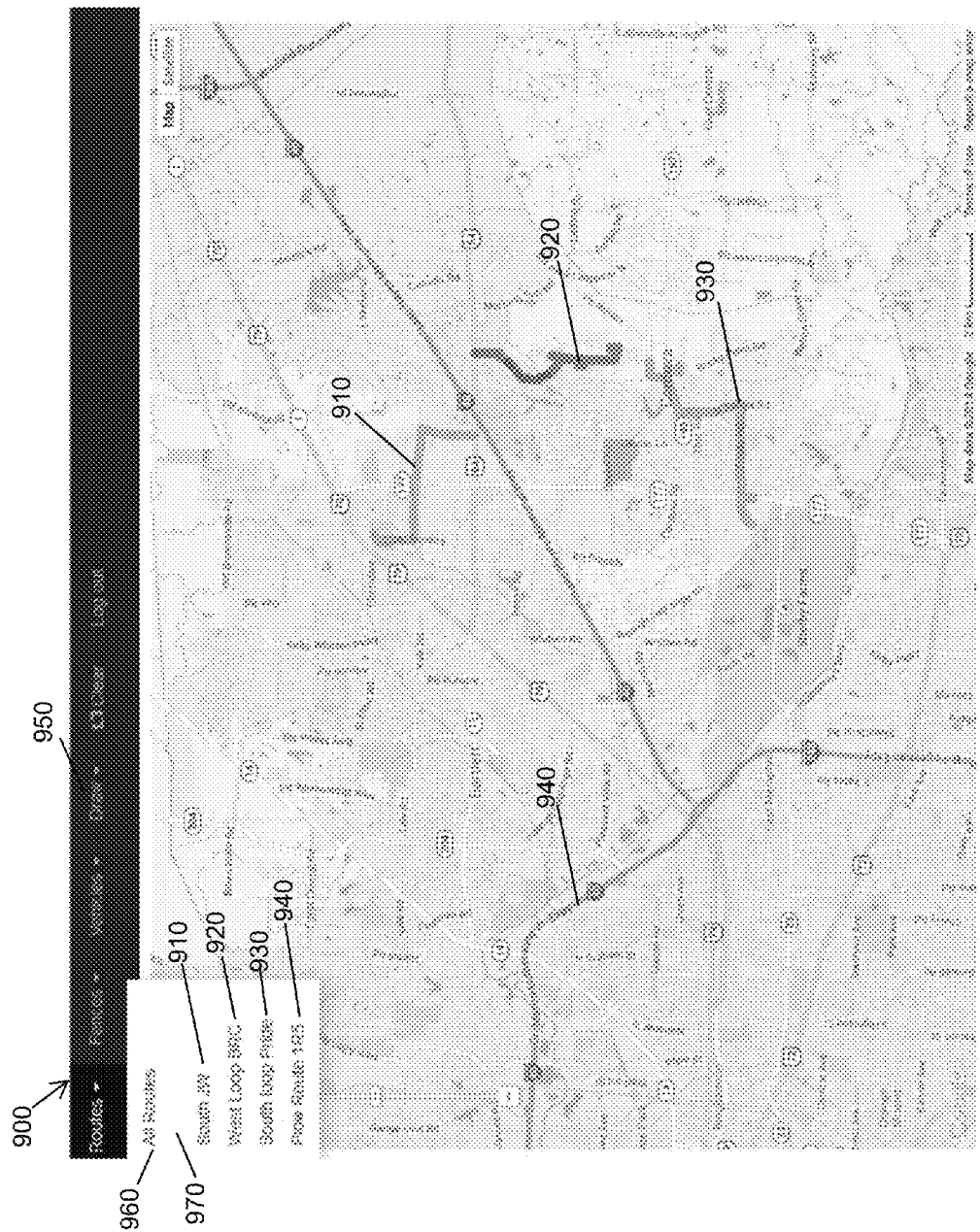
FIG. 9 is a screen shot showing a user-created designated route, which is followed by a vehicle or asset on a regular basis, in an embodiment of a tracking software.
Figure 10:
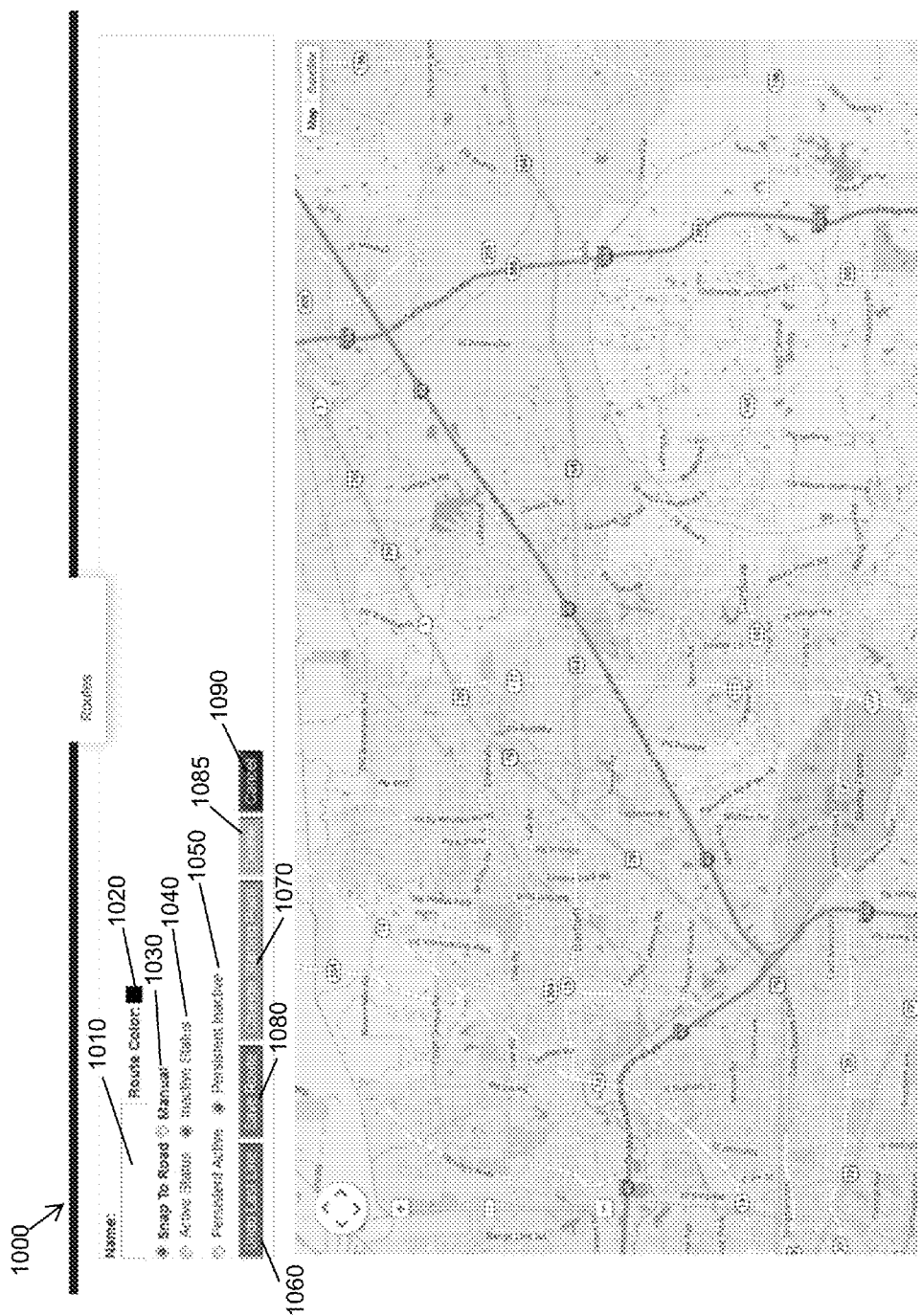
FIG. 10 is a screen shot showing a route set-up page "Draw" that allows the user to create and edit routes, in an embodiment of a tracking software.

FIG. 9 is a screen shot 900 showing user-created designated routes 910, 920, 930, 940 which are followed by one or more vehicles or assets on a regular basis, in an embodiment of a tracking software. A route can be created by a user and saved to the tracking software and back-end platform to be viewed and assigned to a driver. Unique routes 910, 920, 930, 940 are displayed and may be differentiated based on color. In some embodiments, the lines may have various patterns such as dashes or other shapes to aid in distinguishing one from another, particularly where large numbers of routes are displayed at once. The Routes dropdown 970 shows four unique routes 910, 920, 930, 940 that have been created and displayed (one in pink 910, one in gray 920, one in blue 930 and one in orange 940). A user can create routes by clicking on the map and on associated streets that are part of a specific route. For example, the user may select the Draw dropdown 950 to draw a route on the displayed map as illustrated in FIG. 10. Once the route-drawing is finished, the user may input route information associated with the drawn route, including the route name and other desired information, and may assign one or more drivers to the route. Multiple routes may be created and named accordingly for quick identification. Routes can be viewed individually or simultaneously. For example, routes may be toggled on or off the display individually by selecting the individual route names 910, 920, 930, 940 from the dropdown, while selecting All Routes 960 from the dropdown may toggle all routes on or off simultaneously. Further, vehicles or assets can be displayed only when on an assigned route such as a trash pickup standard route and/or the route status is viewed by a third party or the general public on a unique web address by which to log in remotely.

FIG. 10 is a screen shot showing a route set-up page "Draw" 1000 that allows the user to create and edit routes, in an embodiment of a tracking software. The user can set the route name using name field 1010 and a color for the route when displayed using color field 1020, and choose whether to snap the drawn route to roads on the map using snap selector 1030. Status selector 1040 may be used to change the route to active or inactive status and persistent status selector 1050 may be used to change the route between persistent active and persistent inactive status. The user may use a mouse or other input to select points for the route on the map, undo route segments using button 1060, change a starting point for the route using button 1070, and save a completed route for display and driver assignment using button 1080. Buttons 1085, 1090 may be used to delete a route and cancel a route in the process of being created, respectively.

Figure 11:
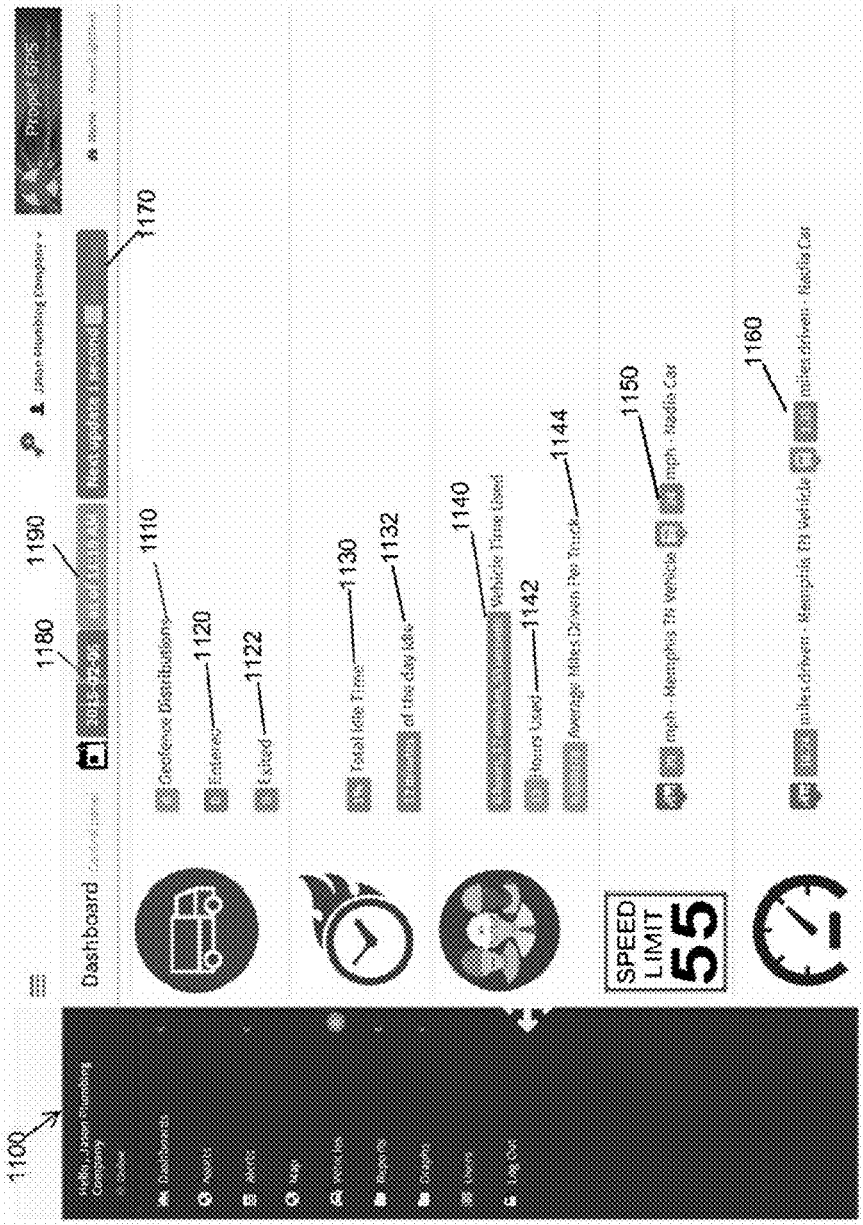
FIG. 11 is a screen shot showing a Fleet Dashboard with an exception reporting focus for paring back unnecessary data prompting and time wasting report reviews, in an embodiment of a tracking software.

FIG. 11 is a screen shot 1100 showing a Fleet Dashboard 1110, in an embodiment of a tracking software. This dashboard is a live (updated every 1 minute) snapshot of the day's events such as geofence entries and exits 1120,1122, total number of geofence alerts sent for the user-selected date and time period displayed 1124, engine idle time percentage and amount 1130,1132, total time (hours, minutes, seconds) the fleet vehicles were used today, total hours passed in the day so far, and average miles driven today per vehicle 1140,1142,1144, top speed of the day 1150 for each vehicle in the fleet and miles driven of the current day 1160 for each vehicle in the fleet. In embodiments, this information may be presented for each vehicle/asset in the fleet separately and/or for the entire fleet combined. A user may select specific assets/vehicles from the fleet to view the statistics for those assets only. In embodiments, the frequency of updating 1170 may vary and/or be user-selectable, as may the time period covered by the snapshot (e.g. day, month, year, etc.). Date 1180 and time 1190 of the dashboard report are displayed for reference.

Figure 12:
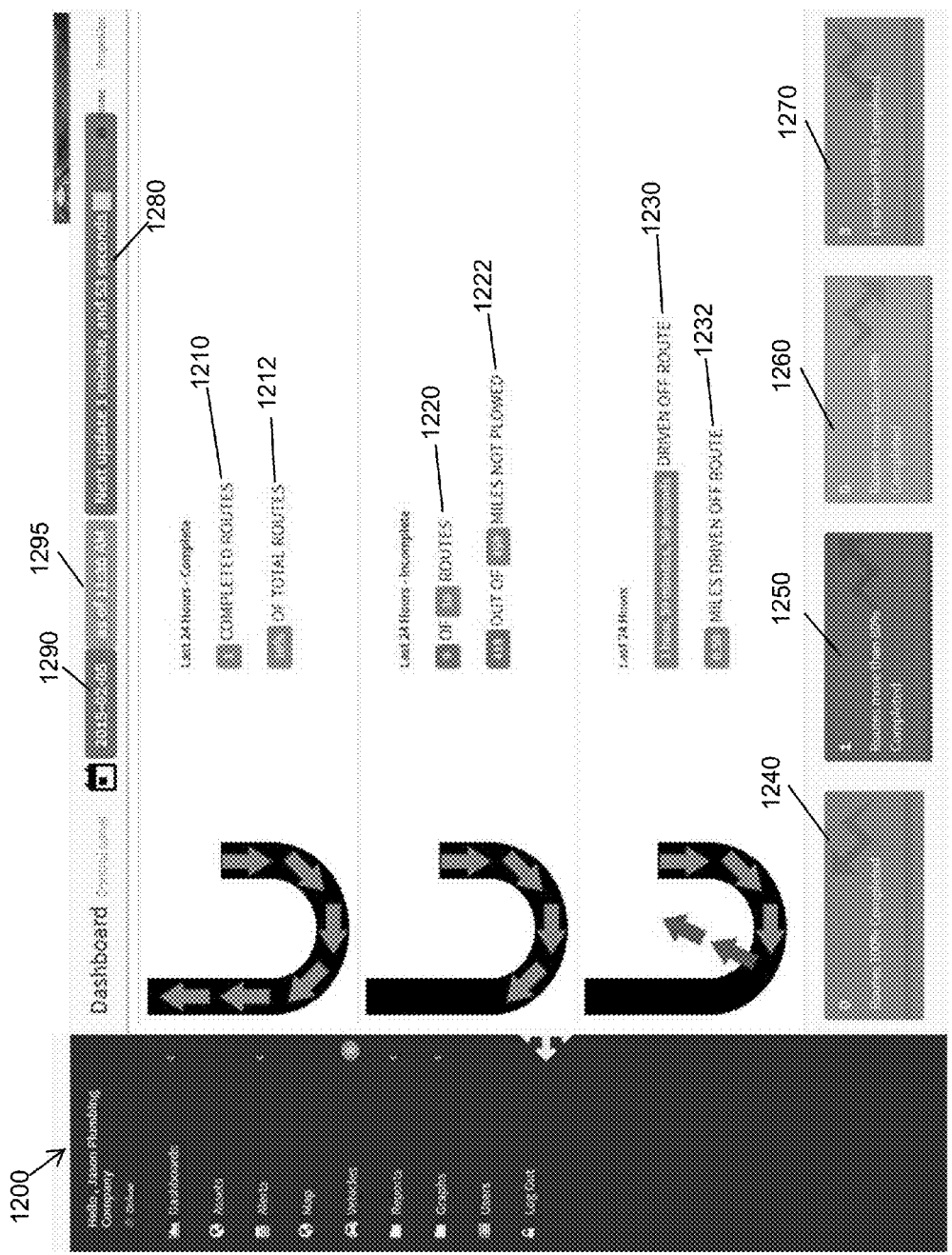
FIG. 12 is a screen shot of a Route Utilization dashboard, in an embodiment of a tracking software.

FIG. 12 is a screen shot 1200 of a Route Utilization dashboard, in an embodiment of a tracking software. This dashboard is a live (updated every one minute) snap shot of the day's events such as number of completed routes 1210 and completion percentage of total routes assigned 1212, number of incomplete routes 1220 and incomplete proportion of total route miles assigned 1222, time driving off routes 1230 and miles driven off route 1232, and time driving on assigned routes. In the screen shot shown, one route was completed and ten routes were assigned, with drivers spending a total of almost two hours driving 0.5 miles off their assigned route. At the bottom of the screen, color codes 1240, 1250, 1260, 1270 are shown, indicating that 100% completed routes are shown in blue, 80%+ completed routes in green, 60%+ completed routes in orange, and less than 60% completed routes in red, with the number of each type of route for the time period covered (here 24 hours). In embodiments, this information may be presented for each vehicle/asset in the fleet separately and/or for the entire fleet combined. A user may select specific assets/vehicles from the fleet to view the statistics for that asset only. In embodiments, the frequency of updating 1280 may vary and/or be user-selectable, as may the time period covered by the snapshot (e.g. day, month, year, etc.). Date 1290 and time 1295 of the dashboard report are displayed for reference.

One embodiment of the invention is implemented as a program product for use with a computer system such as, for example, the computing environment 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive, solid state storage devices); and (iii) information conveyed to a computer by a communications medium, such as through a computer or telephone network, including wireless communications.

The latter embodiment specifically includes information downloaded from the Internet and/or other networks. Such signal-bearing media, when carrying computer-readable instructions that direct the functions of the present invention, represent embodiments of the present invention. In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices.

In addition, various programs described hereinafter may be identified based upon the application for which they are implemented in one or more specific embodiments of the invention. However, it should be appreciated that any particular program nomenclature that follows is used merely for convenience, and thus the invention should not be limited to use solely in any specific application identified and/or implied by such nomenclature. In this regard, references to particular definitional languages, such as HTML and WL, are illustrative in nature and do not serve to limit the claims. It is broadly contemplated that the invention is applicable regardless of the particular schema and/or language used to define network resource content.

Figure 14:
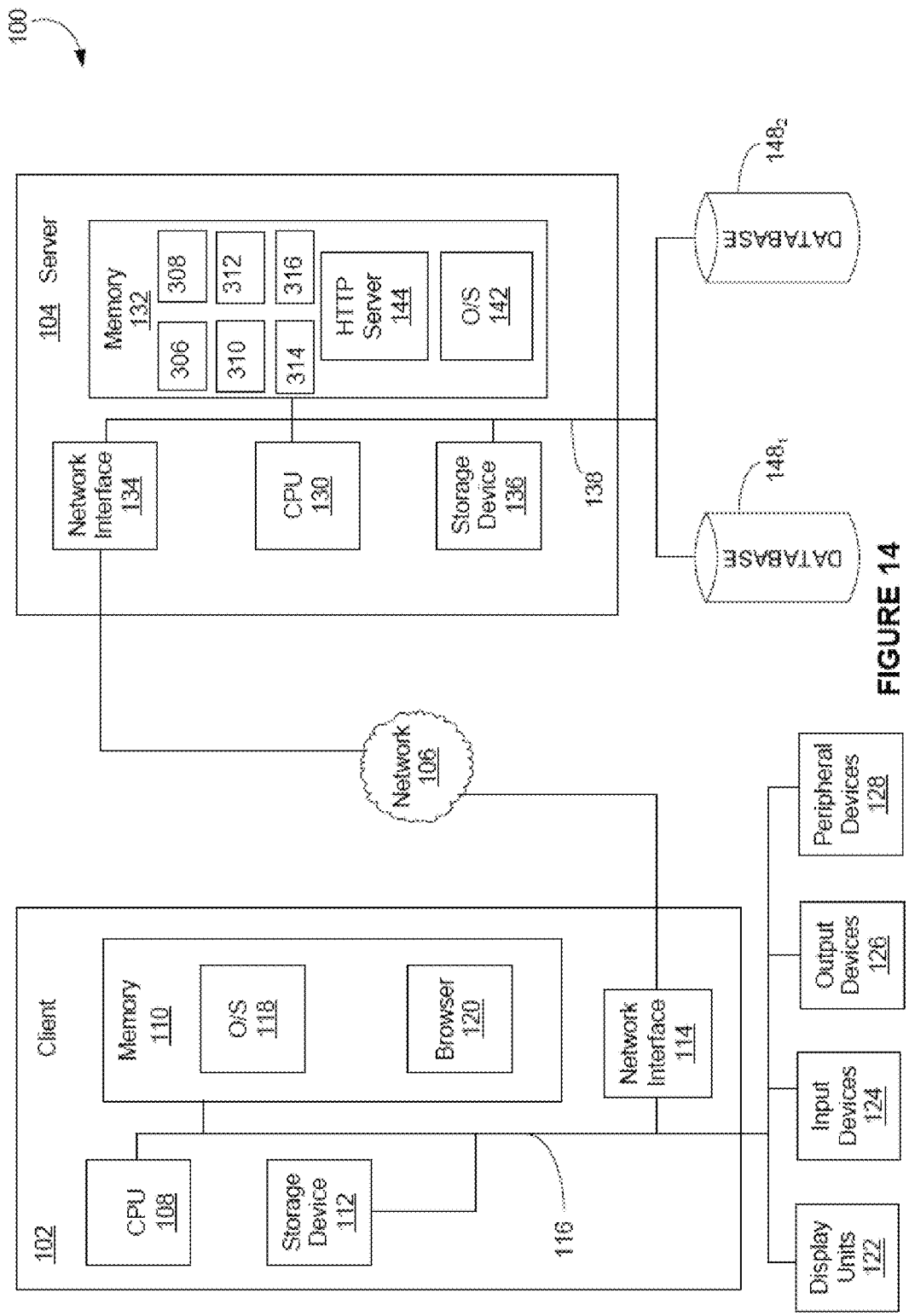
FIG. 14 is a block diagram illustrating an exemplary computing environment 100, in accordance with an embodiment of the present invention

Turning now to FIG. 14, a block diagram illustrating an exemplary computing environment 100, in accordance with an embodiment of the present invention, is shown. In general, the computing environment 100 includes a client (e.g., a user's) computing device (e.g. smartphone) 102, and a server computer 104. The client computing device 102 and the server computer 104 may be components of the same computer system or may be connected via a network 106, such as the Internet. There may be multiple client computing devices 102 (e.g. purchaser and merchant).

As shown, the client computing device 102 includes a central processing unit (CPU) 108 connected to a memory 110, a storage device 112, and a network interface 114 via a bus 116. The CPU 108 is included to be representative of a single CPU, multiple CPUs, a single CPU having multiple processing cores, and the like. The storage device 112 stores application programs and data for use by the client computing device 102. Examples of the storage device 112 include one or more hard-disk drives, flash memory devices, optical media and the like.

The client computing device 102 may be connected to the data communications network 106 (e.g., a local area network, which itself may be connected to other networks such as the internet) using the network interface 114. The memory 110 can be one or a combination of memory devices, including random access memory, nonvolatile or backup memory (e.g., programmable or flash memories, read-only memories, etc.). Illustratively, the memory 110 of client computing device 102 stores an operating system 118 used to manage hardware and software executing on the client computing device 102. As shown, memory 110 also includes a browser program 120 which, when executed by CPU 108, provides support for navigating between various servers and locating network addresses at one or more of servers (e.g., server computer 104). Memory 110 may also contain a local software application (not shown) for facilitating communication with the server 104.

The client computing device 102 may be connected to one or more display units 122, input devices 124, output devices 126 and peripheral devices 128. The display units 122 may be internal or external monitors, television screens, handheld device displays, and the like. The input devices 124 may be any one of a touch screen, keyboard, mouse, track-ball, stylus, mouse pad, mouse button, joystick, scanner or the like. The output devices 126 may be any one of a monitor, printer, plotter, copier or other output device. The peripheral devices 128 may be any other device which can be coupled to a computing device: a CD/DVD drive capable of reading and/or writing to physical digital media, a USB device, Zip Drive, external floppy drive, external hard drive, phone and/or broadband modem, router/gateway, access point and/or the like.

Similar to the client computing device 102, the server computer 104 may include a CPU 130, a memory 132, a network interface device 134, and a storage device 136, coupled via a bus 138. The memory 132 may be a random access memory sufficiently large to hold the necessary programming and data structures that are located on the server computer 104. As shown, the memory 132 stores an operating system 142 used to manage server hardware and software executing on the server computer 104. Illustratively, the memory 132 also includes a hypertext transfer protocol (http) server 144 configured to service requests from the client computing device 102. For example, the http server 144 may respond to requests for access to electronic resources (e.g., HTML documents, network information, and the like) residing on the server computer 104. However, one of ordinary skill in the art will recognize that the http server 144 is merely illustrative and embodiments of the invention may be adapted to support both known and unknown protocols.

The programming and data structures of the http server 144 may be accessed and executed by the CPU 130 as needed during operation. The server computer 104 may connect to the network 106 using the network interface device 134 (e.g., an analog modem, a wired network card, or a wireless network device).

In one embodiment, users may interact with the server computer 104 using a graphical user interface (GUI). In a particular embodiment, GUI content may comprise HTML documents (i.e., web pages) rendered on the display unit 122 coupled with the client computing device 102 using the browser 120. In one embodiment, the web pages may include pages that allow a user to register a user account and upload user account information.

The memory 132 may further include modules 146, 148, 150, 152, 154, 156 such as a communications module, a display module, an asset information module, a geofence module, a route module, and a dashboard module. The modules 146, 148, 150, 152, 154, 156 may comprise a software application configured to track and manage remote assets.

Accordingly, the server computer 104 may be coupled to a plurality of databases $148_1$, $148_2$ which may include a relational database $148_1$ that is queried using an SQL query, or an XML database $148_2$ queried using an XML query. The invention, however, is not limited to any particular physical database storage mechanism and may readily be extended to operate on other such mechanisms, whether currently known or unknown. While the databases $148_1$, $148_2$ are illustrated as being external to the server system, it is noted that the databases $148_1$, $148_2$ may exist on a local storage device (e.g., storage device 136) of the server computer 104, or may be accessed over the network 106.

Figure 13:
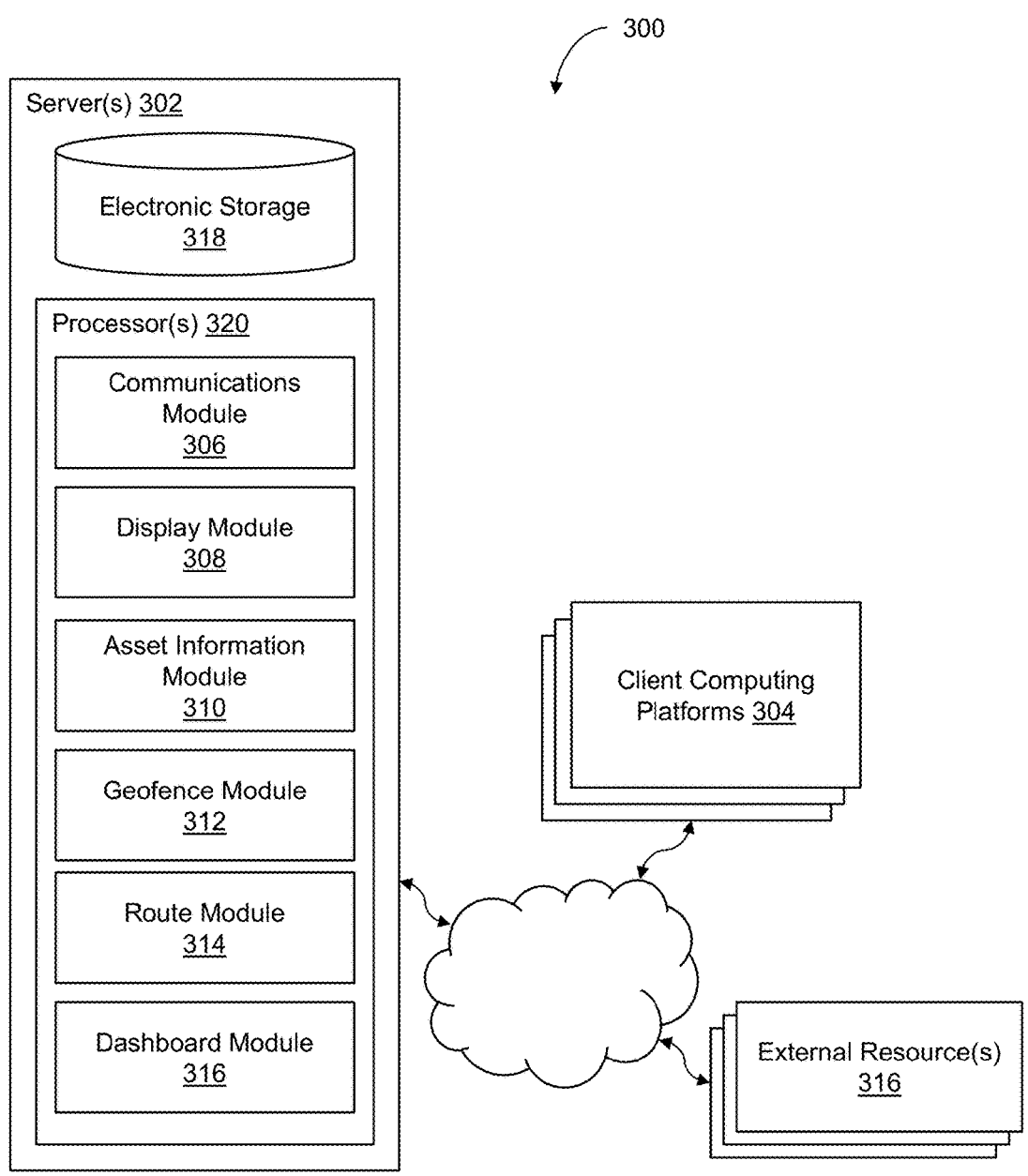
FIG. 13 is a diagram illustrating a system configured to track and manage remote assets, in accordance with one or more implementations

FIG. 13 illustrates a system 300 configured to track and manage remote assets, in accordance with one or more implementations. In some implementations, system 300 may include one or more servers 302. The server(s) 302 may be configured to communicate with one or more client computing platforms 304 according to a client/server architecture. The users may access system 300 via client computing platforms 304 (e.g. computer, smartphones), for instance, to track and manage remote assets.

The server(s) 302 may be configured to execute one or more computer program modules. The computer program modules may include one or more of a communications module 306, a display module 308, an asset information module 310, a geofence module 312, a route module 314, a dashboard module 316, and/or other modules. As noted, the client computing platforms 304 may include one or more computer program modules that are the same as or similar to the computer program modules of the server(s) 302 to carry out similar functions locally.

Communications module 306 may be configured to receive requests for data from remote user computing devices and to transmit requested data to the remote user computing devices.

Display module 308 may be configured to display the requested data on the remote user computing device, including displaying data from the positioning sensor overlaid on a map to indicate a position of the asset.

Asset information module 310 may be configured to receive asset information from the remote user computing device and associate it with the asset, wherein the asset information includes graphics for display on the map as part displaying the data from the positioning sensor.

Geofence module 312 may be configured to receive geofence coordinates from the remote user computing device and send a notification when the data indicates that the asset crosses a boundary between the geofence coordinates.

Route module 314 may be configured to receive route information from the remote user computing device, associate a driver with a route, and determine from the data whether the driver completes the route and whether the driver leaves the route.

Dashboard module 316 may be configured to display a time-period data summary on the remote user computing device detailing information associated with the asset position over a set period of time and to display a route summary on the remote user computing device detailing compliance with set routes by the driver over the time period.

In some implementations, server(s) 302, client computing platforms 304, and/or external resources 316 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 302, client computing platforms 304, and/or external resources 316 may be operatively linked via some other communication media.

A given client computing platform 304 may include one or more processors configured to execute computer program modules. The computer program modules may be configured to enable an expert or user associated with the given client computing platform 304 to interface with system 300 and/or external resources 316, and/or provide other functionality attributed herein to client computing platforms 304. By way of non-limiting example, the given client computing platform 304 may include one or more of a desktop computer, a laptop computer, a handheld computer, a netbook, a smartphone, a gaming console, and/or other computing platforms.

The external resources 316 may include sources of information, hosts and/or providers of web sites outside of system 300, external entities participating with system 300, and/or other resources. In some implementations, some or all of the functionality attributed herein to external resources 316 may be provided by resources included in system 300.

The server(s) 302 may include electronic storage 318, one or more processor(s) 320, and/or other components. The server(s) 302 may include communication lines, or ports to enable the exchange of information with a network and/or other computing platforms. Illustration of server(s) 302 in FIG. 3 is not intended to be limiting. The server(s) 302 may include a plurality of hardware, software, and/or firmware components operating together to provide the functionality attributed herein to server(s) 302. For example, server(s) 302 may be implemented by a cloud of computing platforms operating together as server(s) 302.

Electronic storage 318 may comprise electronic storage media that electronically stores information, including user account information such as name, login information, registered phone information, payment information, user settings, funds in the user account, etc. The electronic storage media of electronic storage 318 may include one or both of system storage that is provided integrally (i.e., substantially non-removable) with server(s) 302 and/or removable storage that is removably connectable to server(s) 302 via, for example, a port (e.g., a USB port, a firewire port, etc.) or a drive (e.g., a disk drive, etc.). Electronic storage 318 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 318 may include one or more virtual storage resources (e.g., cloud storage, a virtual private network, and/or other virtual storage resources). Electronic storage 318 may store software algorithms, information determined by processor(s) 320, information received from server(s) 302, information received from client computing platforms 304, and/or other information that enables server(s) 302 to function as described herein.

Processor(s) 320 is configured to provide information processing capabilities in server(s) 302. As such, processor(s) 320 may include one or more of a digital processor, an analog processor, a digital circuit designed to process information, an analog circuit designed to process information, a state machine, and/or other mechanisms for electronically processing information. Although processor(s) 320 is shown in FIG. 3 as a single entity, this is for illustrative purposes only. In some implementations, processor(s) 320 may include a plurality of processing units. These processing units may be physically located within the same device, or processor(s) 320 may represent processing functionality of a plurality of devices operating in coordination. The processor(s) 320 may be configured to execute modules 306, 308, 310, 312, 314, 316 and/or other modules. The processor(s) 320 may be configured to execute modules 306, 308, 310, 312, 314, 316 and/or other modules by software; hardware; firmware; some combination of software, hardware, and/or firmware; and/or other mechanisms for configuring processing capabilities on processor(s) 320. As used herein, the term "module" may refer to any component or set of components that perform the functionality attributed to the module. This may include one or more physical processors during execution of processor readable instructions, the processor readable instructions, circuitry, hardware, storage media, or any other components. The processor readable instructions may be stored on non-transitory computer readable storage media of the computing devices.

As noted, in certain implementations, a given client computing platform 304 may include one or more computer program modules that are the same as or similar to the computer program modules of the server(s) 302. The given client computing platform 304 may include one or more processors that are the same or similar to processor(s) 320 of the server(s) 302 to execute such computer program modules of the given client computing platform 304. Although shown as located on server 302, some modules may be distributed across two or more device (e.g. server 302 and client computing platform(s) 304) or located entirely on client computing platform(s) 304.

It should be appreciated that although modules 306, 308, 310, 312, 314, and 316 are illustrated in FIG. 3 as being co-located within a single processing unit, in implementations in which processor(s) 320 includes multiple processing units, one or more of modules 306, 308, 310, 312, 314, and/or 316 may be located remotely from the other modules. The description of the functionality provided by the different modules 306, 308, 310, 312, 314, and/or 316 described below is for illustrative purposes, and is not intended to be limiting, as any of modules 306, 308, 310, 312, 314, and/or 316 may provide more or less functionality than is described. For example, one or more of modules 306, 308, 310, 312, 314, and/or 316 may be eliminated, and some or all of its functionality may be provided by other ones of modules 306, 308, 310, 312, 314, and/or 316. As another example, processor(s) 320 may be configured to execute one or more additional modules that may perform some or all of the functionality attributed below to one of modules 306, 308, 310, 312, 314, and/or 316.

Figure 15:
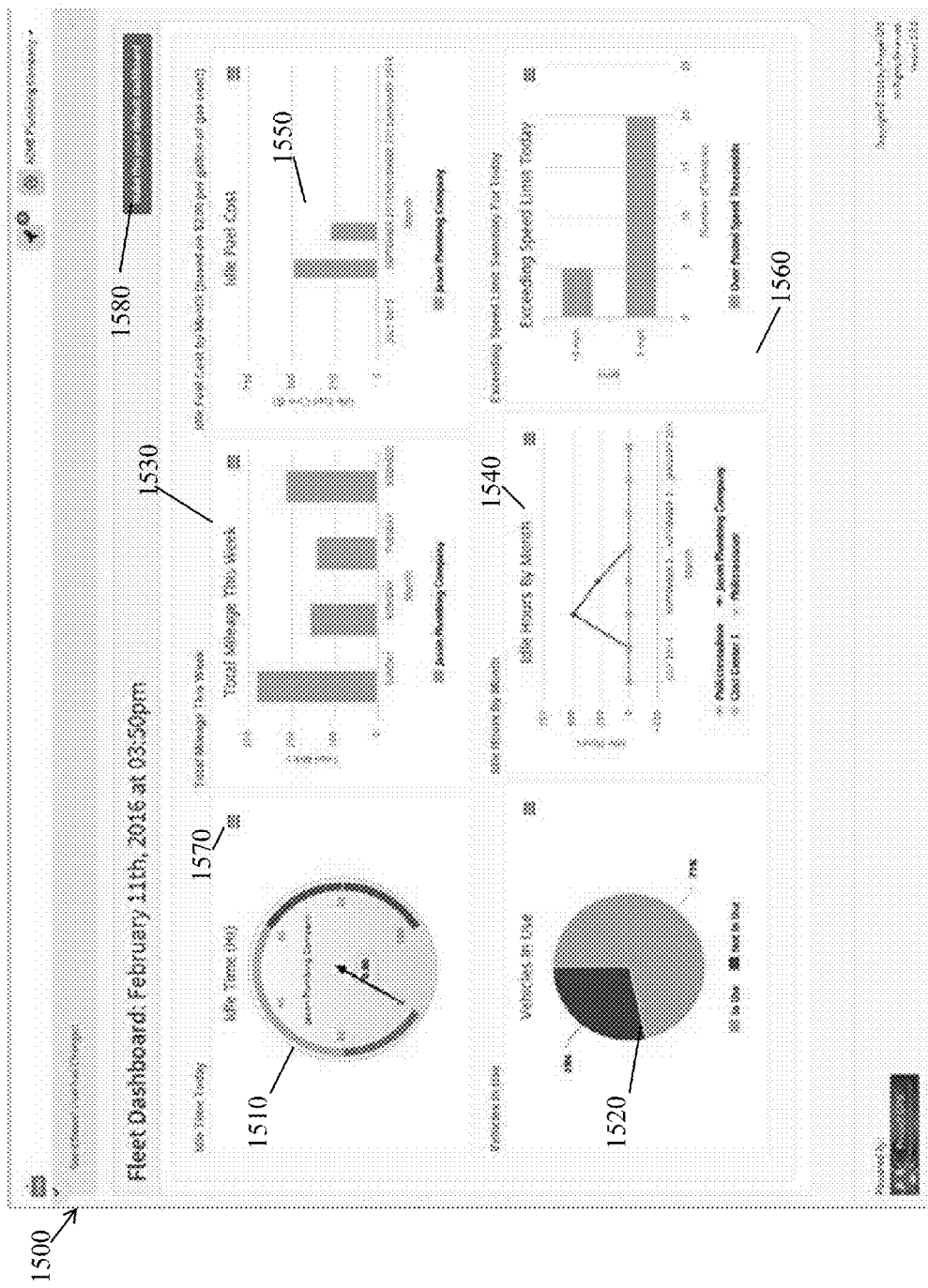
FIG. 15 is a screen shot showing a Fleet Dashboard, in an embodiment of a tracking software.

FIG. 15 is a screen shot showing a Fleet Dashboard 1500, in an embodiment of a tracking software. On this dashboard is an idle time chart 1510 showing hours of idle time for the fleet today, in use pie chart 1520 showing the percentage of fleet vehicles in use versus not in use today, total mileage bar chart 1530 showing total fleet mileage by day, idle hour line chart 1540 showing idle hours per month broken down by fleet, idle fuel cost bar chart 1550 showing monthly fuel cost due to idling, and speed limit exceeder bar chart 1560 showing number of fleet vehicles traveling 5 mph and 15 mph over posted speed limits today. Each chart 1510-1560 has an associated settings icon 1570 from which chart parameters can be changed, allowing the user to change the way the data is displayed such as the form of the chart (pie chart, bar chart, etc.), type of data displayed, time period covered, etc. The dashboard is user-configurable so that the user an see at a glance the information most important to that particular user. Once the user has set the dashboard to show the desired information in the desired format, default dashboard selector 1580 can be selected to make the fleet dashboard with those settings show up for the user from then on. The settings can still be tweaked in the future if the user wants to view other information/formats for any reason.

Figure 16:
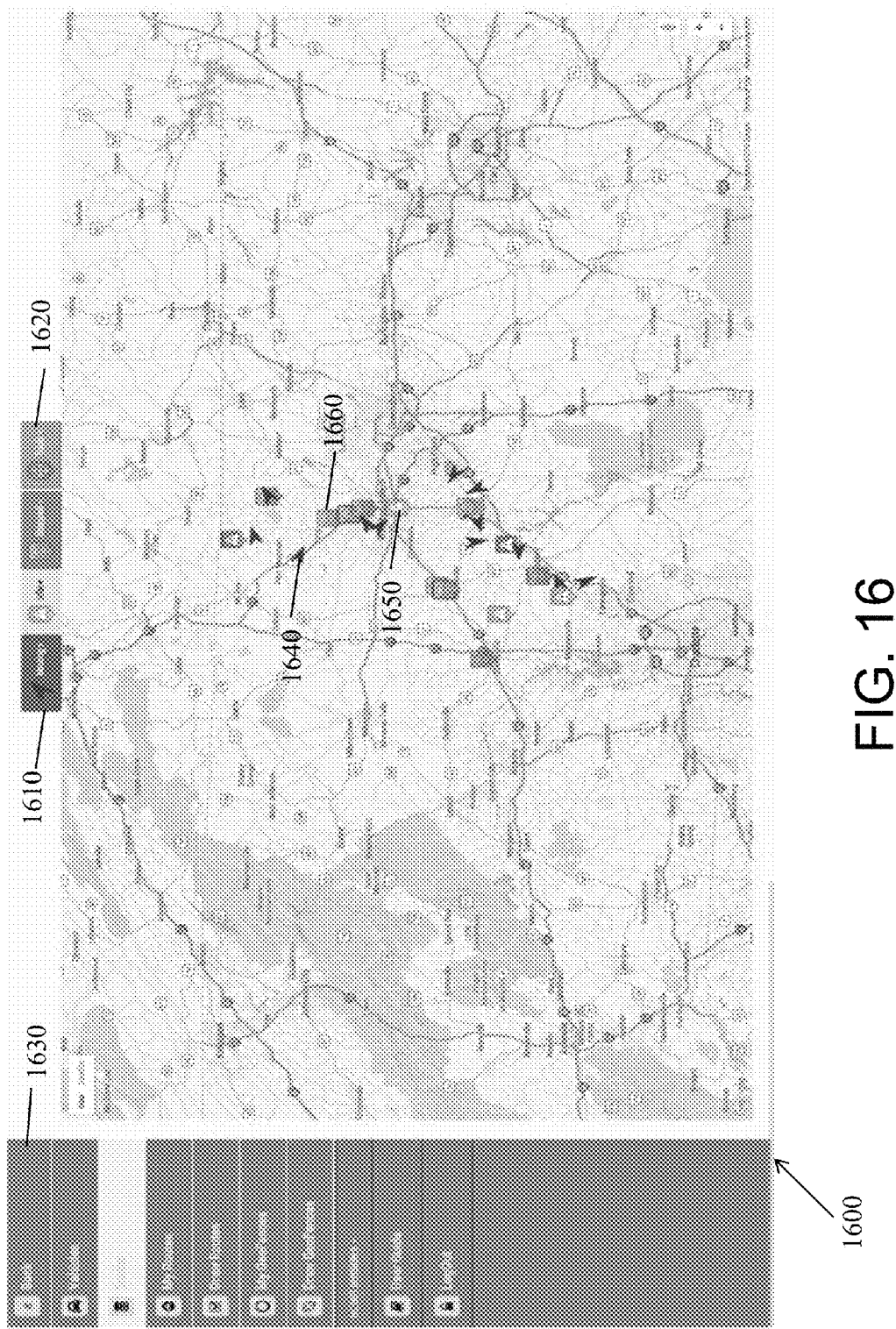
FIG. 16 is a screen shot showing a Fleet Status page, in an embodiment of a tracking software.

FIG. 16 is a screen shot 1600 showing a Fleet Status page, in an embodiment of a tracking software. Three different icons 1640, 1650, 1660 shown on this map indicate the current status of assets/vehicles in a fleet. If the vehicle is moving it is indicated by a green directional arrow 1640. If the vehicle is idling it is indicated by a flashing yellow triangle 1650. If the vehicle is stopped it is indicated by a red stop sign 1660. Legend 1610 explains the meaning of the icons. Tools selector 1620 shows a dropdown of various operations that can be performed, when selected by a user. The dropdown may include options to Show Info Popups, to show the status details boxes of all vehicles on the map, Auto Update Every X Minutes, where X is a default or user-configurable number, to toggle on or off automatically updates of the vehicle statuses on the map periodically, and Update Now to immediately update the status of all vehicles shown on the map to their current statuses. A user may hover over an icon 1640, 1650, 1660 to see more information including vehicle name, date and time of last update, address if one is available, and how long it has been in its current status. A user can turn on or off the display of vehicles in a given status by clicking on the menu 1610 in the top menu bar, and choosing Show or Hide from a resulting dropdown.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Software programming or code can be stored in a computer-readable medium and can be operated on by a processor to permit a computer to perform any of the steps, operations, methods, routines or portions thereof described herein. Various steps and functions of embodiments herein may be described as being carried out by specialized modules. It will be understood for purposes of this disclosure that a module is one or more computer processes, computing devices or both, configured to perform one or more functions. A module may present one or more interfaces which can be utilized to access these functions. Such interfaces include APIs, web services interfaces presented for a web services, remote procedure calls, remote method invocation, etc. The term 'module' may refer to one or more physical processors during execution of processor readable instructions, the processor readable instructions, circuitry, hardware, storage media, or any other components.

These and other objectives and features of the invention are apparent in the disclosure, which includes the above and ongoing written specification.

The invention is not limited to the particular embodiments described above in detail. Those skilled in the art will recognize that other arrangements could be devised. While the invention has been described with reference to specific illustrative embodiments, modifications and variations of the invention may be constructed without departing from the scope of the invention.

We claim:

1. A system, comprising:
   a plurality of different types of sensors installed on an vehicle to be tracked, wherein the sensors comprise a GPS receiver and a second sensor; and
   a remote central computing device configured to receive sensor data from the plurality of different types of sensors, process the sensor data, associate it with a date/time of generation, and store the sensor data in a database of the system, the system further comprising modules including:
   a communications module configured to receive requests for sensor data from a remote user computing device and to transmit the requested sensor data to the remote user computing device;
   a display module configured to display the requested sensor data on the remote user computing device, including displaying position data from the GPS receiver overlaid on a map to indicate a position of the vehicle;
   a vehicle information module configured to receive vehicle information from the remote user computing device and associate the vehicle information with the vehicle;
   a route module configured to receive route information from the remote user computing device, associate a driver with a route, and determine from the position data received from the GPS receiver whether the driver completes the route and whether the driver leaves the route;
   a dashboard module configured to display a time-period data summary on the remote user computing device detailing information associated with the vehicle position over a set period of time and to display a route summary on the remote user computing device detailing compliance with set routes by the driver over the set period of time;
   a geofence module configured to receive geofence coordinates from the remote user computing device and send a notification when the position data indicates that the vehicle crosses a boundary between the geofence coordinates; and
   a remote control module configured to receive instructions for remote control of a vehicle and open an interposing relay that controls flow of electricity to a circuit on the vehicle accordingly.

2. The system of claim 1, wherein the vehicle information includes graphics for displaying the position data from the GPS receiver on the map.

3. The system of claim 1, wherein the circuit on the vehicle is a starter circuit, wherein opening the interposing relay prevents the vehicle from starting, and wherein the remote control module is further configured to verify that the vehicle is not operating before opening the interposing relay.

4. The system of claim 1, wherein displaying the time-period data summary detailing information associated with the vehicle position over the set period of time comprises displaying geofence violations, engine idle time, total time of use for the vehicle, top speed, and miles driven.

5. The system of claim 4, wherein the vehicle and additional vehicles make up a fleet, wherein the dashboard module is further configured to display the time-period data summary for the fleet, and wherein the time-period data summary includes fleet-level statistics.

6. The system of claim 5, wherein displaying position data from the GPS receiver overlaid on a map to indicate a position of the vehicle further comprises indicating a position and current route of each vehicle in the fleet on the map simultaneously.

7. The system of claim 1, wherein displaying a route summary comprises displaying for the vehicle a number of completed routes and percentage of total routes completed, a number of incomplete routes and a number of routed miles not traveled, and a time and distance driven off-route.

8. The system of claim 1, further comprising a notification module configured to send a notification to the remote user computing device in response to the plurality of different types of sensors detecting on the vehicle a temperature violation, an open door, a low or high tank level, an alarm system activation, a panic button activation, speed exceeding a threshold level, geofence crossing, landmark arrival or departure, and/or a route change.

9. An after-market vehicle tracking method, comprising:
installing a plurality of sensors on a vehicle to be tracked, wherein the plurality of sensors comprise a GPS receiver and a second sensor;
transmitting sensor data wirelessly from the plurality of sensors to a remote central computing device;
processing the sensor data, associating the sensor data with a date/time of generation, and storing the sensor data in a database;
receiving a request for some of the sensor data from a remote user computing device; transmitting the requested sensor data to the remote user computing device;
displaying the requested sensor data on the remote user computing device, including displaying position data from the GPS receiver overlaid on a map to indicate a position of the vehicle;
receiving vehicle information from the remote user computing device and associating the vehicle information with the vehicle;
displaying a time-period data summary on the remote user computing device detailing information associated with the vehicle position over a set period of time;
receiving route information from the remote user computing device, associating a driver with a route, and determining from the position data whether the driver completes the route and whether the driver leaves the route;
displaying a route summary on the remote user computing device detailing compliance with set routes by the driver over the set period of time period;
receiving geofence coordinates from the remote user computing device and sending a notification when the position data indicates that the vehicle crosses a boundary between geofence coordinates; and
receiving instructions for remote control of a vehicle and opening an interposing relay that controls flow of electricity to a circuit on the vehicle accordingly.

10. The method of claim 9, wherein the vehicle information includes graphics for displaying the position data from the GPS receiver on the map.

11. The method of claim 9, wherein the circuit on the vehicle is a starter circuit, wherein opening the interposing relay prevents the vehicle from starting, and verifying that the vehicle is not operating before opening the interposing relay.

12. The method of claim 9, wherein displaying the time-period data summary detailing information associated with the vehicle position over the set period of time comprises displaying geofence violations, engine idle time, total time of use for the vehicle, top speed, and miles driven.

13. The method of claim 12, wherein the vehicle and additional vehicles make up a fleet, further comprising displaying a time-period data summary for the fleet, and wherein the time-period data summary for the fleet includes fleet-level statistics.

14. The method of claim 13, wherein displaying position data from the GPS receiver overlaid on a map to indicate a position of the vehicle further comprises indicating a position and current route of each vehicle in the fleet on the map simultaneously.

15. The method of claim 9, wherein displaying a route summary comprises displaying for the vehicle a number of completed routes and percentage of total routes completed, a number of incomplete routes and a number of routed miles not traveled, and a time and distance driven off-route.

16. The method of claim 9, further comprising sending a notification to the remote user computing device in response to the plurality of sensors detecting on the vehicle a temperature violation, an open door, a low or high tank level, an alarm system activation, a panic button activation, speed exceeding a threshold level, geofence crossing, landmark arrival or departure, and/or a route change.

* * * * *